United States Patent

[11] 3,624,352

| [72] | Inventors | Homer W. Deaton<br>Centerville, Ohio;<br>Donald C. Siegla, Utica, Mich. |
|---|---|---|
| [21] | Appl. No. | 74,399 |
| [22] | Filed | Sept. 22, 1970 |
| [45] | Patented | Nov. 30, 1971 |
| [73] | Assignee | General Motors Corporation<br>Detroit, Mich. |

[54] CERAMIC TOP RANGE SURFACE TEMPERATURE CUT-OFF THERMOSTATIC DEVICE
4 Claims, 8 Drawing Figs.

[52] U.S. Cl.................................................. 219/449,
219/451, 219/464, 219/494, 219/510
[51] Int. Cl..................................................... H05b 3/68
[50] Field of Search............................................ 219/449,
450, 451, 452, 463, 464, 467, 494, 510, 441;
338/280

[56] References Cited
UNITED STATES PATENTS

| 600,057 | 3/1898 | Ball | 338/280 |
|---|---|---|---|
| 2,450,399 | 9/1948 | Schiedler | 219/453 |
| 3,290,484 | 12/1966 | Day | 219/441 |
| 3,330,939 | 7/1967 | Jacobs | 219/449 |
| 3,406,279 | 10/1968 | Ziver | 219/464 |
| 3,423,572 | 1/1969 | Pansing | 219/449 |

Primary Examiner—Volodymyr Y. Mayewsky
Attorneys—William S. Pettigrew, Frederick M. Ritchie and Edward P. Barthel ABSTRACT: An infrared ceramic cooking assembly having a plurality of radiant heating units wherein each unit has an underlying low density refractory fiber thermal insulating heater block supporting an open coil resistance element in spaced relation to a glass-ceramic cover plate located on the heater blocks. Each unit has a surface temperature limiting device in combination therewith including a thermostat supporting bracket having a heat sensing flange in direct pressure contact with the undersurface of the cover plate and supported on the heater block surface such that the temperature of each bracket flange serves as an analog of the cover plate utensil heating area temperature influencing its associated thermostat for preventing energization of the unit when the overlying heating area exceeds a predetermined temperature.

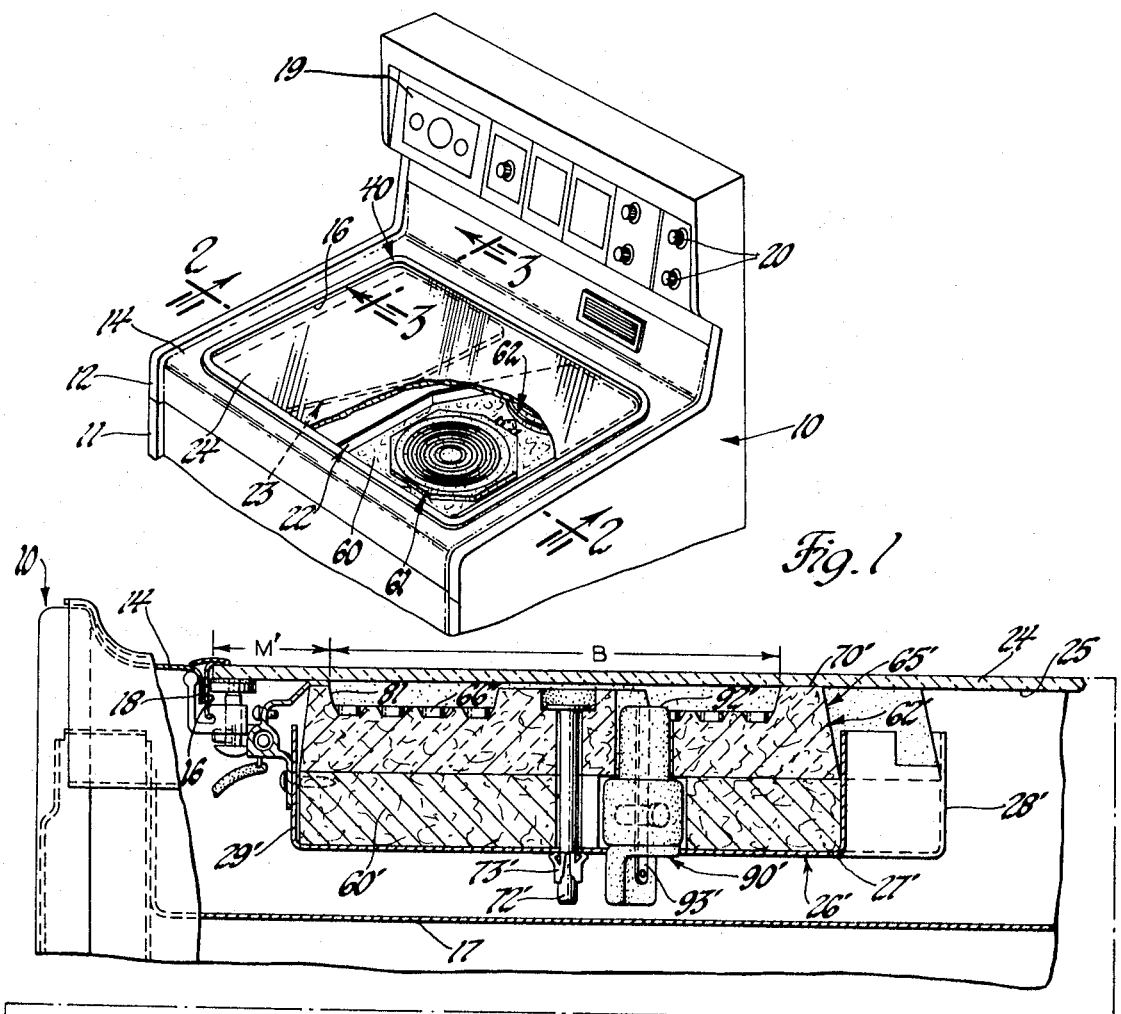
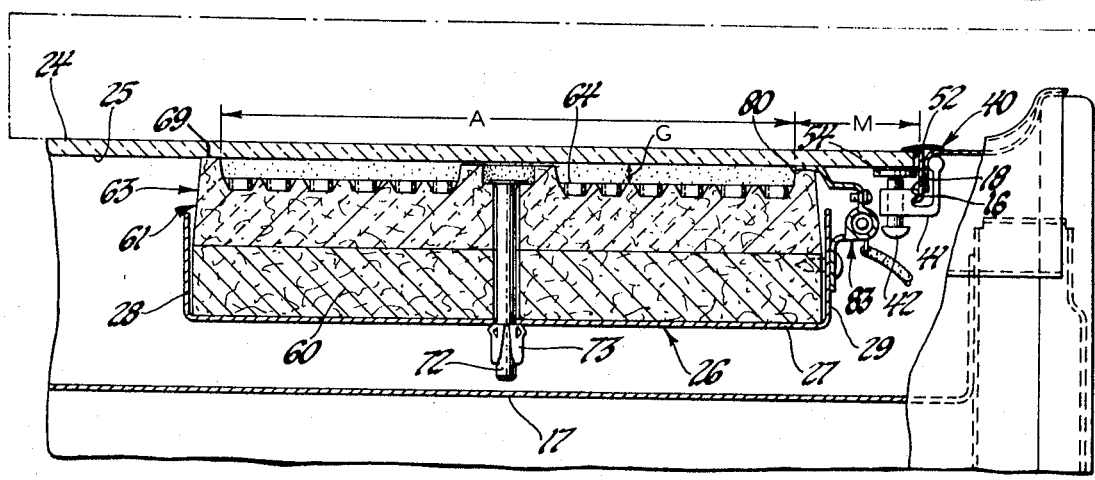
Fig. 1
Fig. 2
INVENTORS
Homer W. Deaton &
BY Donald C. Siegla
Edward P. Barthel
ATTORNEY

PATENTED NOV 30 1971

INVENTORS
Homer W. Deaton &
BY Donald C. Siegla
Edward P. Barthel
ATTORNEY

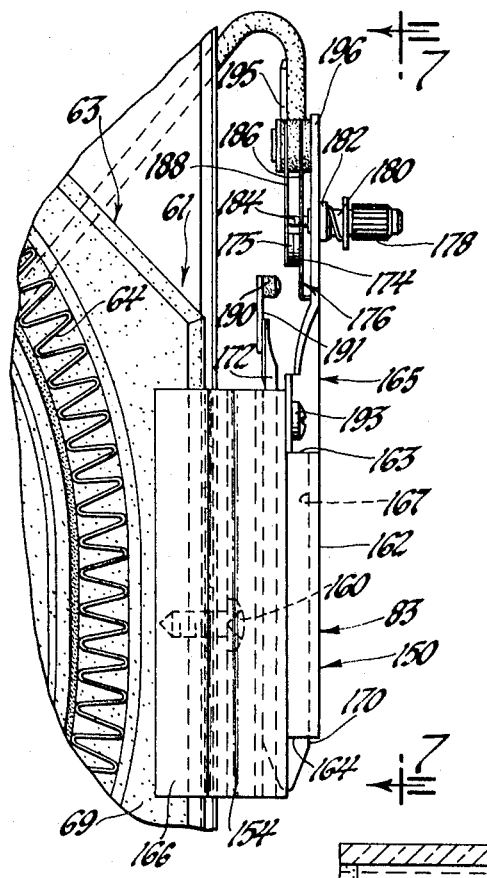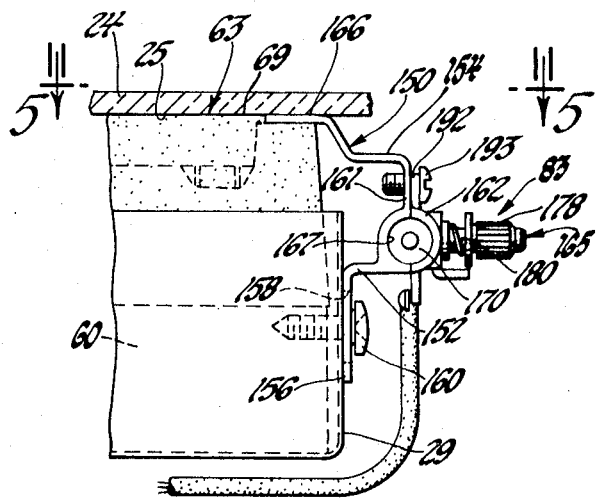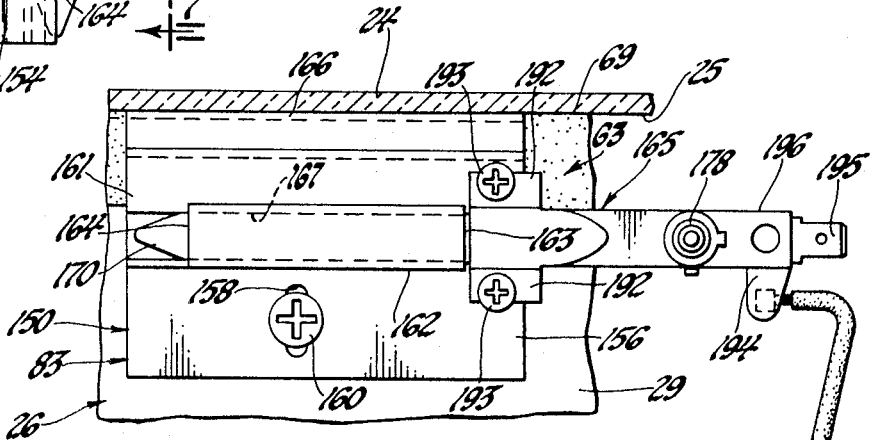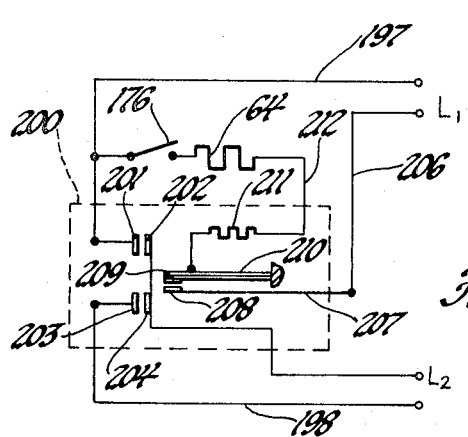

CERAMIC TOP RANGE SURFACE TEMPERATURE CUT-OFF THERMOSTATIC DEVICE

This invention relates to domestic ranges and more particularly to a ceramic top range having an arrangement for preventing the overheating of the glass-ceramic cover plate.

The use of ceramic top ranges and other infrared radiant cooking devices employing radiant cooking units has been limited in the past by the fact that glass-ceramic material used for the infrared transmissive cover plates should not be operated above certain critical temperatures. The issued U.S. Pat. No. 3,448,245 entitled "Temperature Limiting Circuit Arrangement" discusses the problem of glass-ceramic cover plates for ranges that may undergo permanent change in physical properties of the material resulting from exposure to temperatures exceeding the design maximum of the particular glass-ceramic material being used. The ceramic top ranges are particularly susceptible to overheating when a heating unit is energized when, through inadvertence or mistake, there is no cooking utensil located on the corresponding heating area of the cover plate or the cooking vessel has a reflective underside and is making poor thermal contact with the glass-ceramic cooking surface. Various methods have been proposed to prevent overheating such as the use of thermistor elements in conjunction with the heating units. This approach not only requires expensive electronic components to be used in the circuitry but the precise location at which the thermistors should be affixed to the glass-ceramic cover plate cannot be determined with any degree of certainty because of the variance in cooking vessels which may be used with the ceramic top range. Furthermore, the location of any type of sensor including a thermistor on the undersurface of the cover plate would show up as an undesirable dark shadow or spot in the "orange glow" of the heating area after energization of a heating unit whereas such a shadow would ordinarily not be visible because of the opaque or translucent nature of the cover plate in its cooled state.

Accordingly, it is an object of the present invention to provide infrared radiant ceramic top cooking assembly of the open coil type having a thermal responsive temperature limiting control for preventing the overheating of glass-ceramic type cover plates.

It is another object of the invention to provide a surface temperature limiting device for an infrared radiant ceramic top cooking assembly which utilizes open coil resistance element heater blocks in direct pressure contact with an infrared transmissive glass-ceramic cover plate in combination with mounting means which thermally isolates a responsive temperature control for limiting the temperature of the cover plate heating area to a preselected maximum temperature.

Another object of the invention is providing a ceramic top range having a plurality of radiant heating units defining cover plate heating areas wherein each unit has a relatively inexpensive surface temperature cutoff device in combination therewith including bracket means having a heat sensing flange cooperating with each unit in sandwiched pressure contact between the undersurface of the cover plate and the resistance element heater block such that each of the heat sensing flanges is positioned without the confines of its associated heating area to thereby serve as an analog of the cover plate heating area temperature for positively deenergizing its associated unit when the cover plate heating area temperature exceeds the predetermined temperature so as not to interfere with the transmission of infrared rays from the resistant element to the cover plate heating area.

Further objects and advantages of the present invention will be apparent from the following description, reference being had to the accompanying drawings wherein a preferred embodiment of the present invention is clearly shown.

In the drawings:

FIG. 1 is a fragmentary perspective view of a domestic range parts broken away to show the present invention;

FIG. 2 is an enlarged view in vertical section taken along the line 2—2 in FIG. 1;

FIG. 5 is an enlarged fragmentary view in plane taken on line 5—5 of FIG. 6 of one of the thermostatic devices;

FIG. 6 is an enlarged fragmentary end view of the thermostatic device;

FIG. 7 is an enlarged fragmentary side view taken on line 7—7 of FIG. 5;

FIG. 8 is a partial schematic diagram of one heating unit for the cooking assembly of the present invention.

Figures 3, 4:
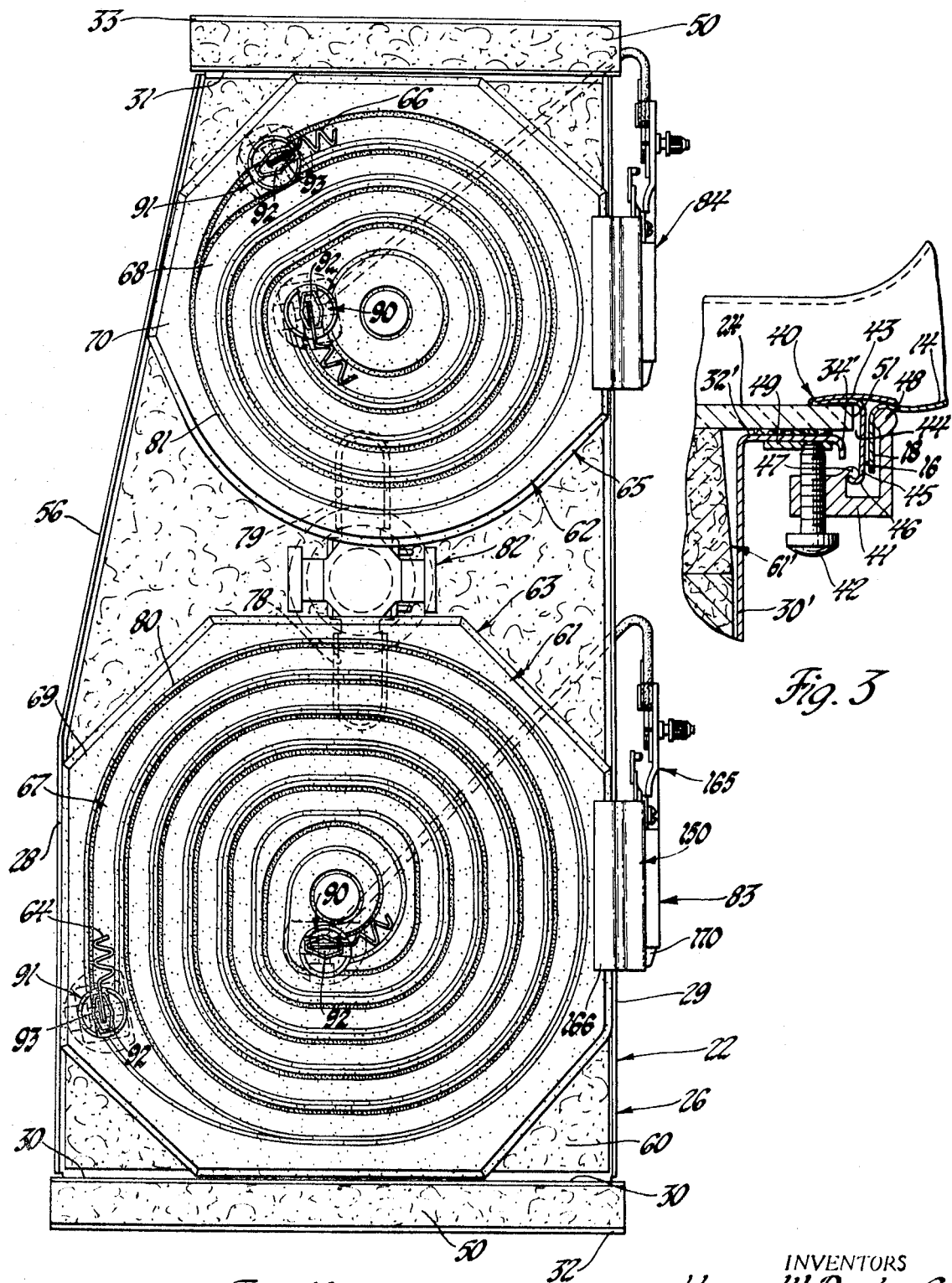
FIG. 3 is an enlarged view in vertical section along the lines 3—3 of FIG. 1.
FIG. 4 is an enlarged view in top elevation of one of the heating assemblies removed from the range and showing a 6-inch heating unit and an 8-inch heating unit therein.

Referring now to the drawings, in FIG. 1 a domestic range 10 is illustrated having a metal body 11 supporting an upper casing 12 which includes a collar 14 around the top edge thereof forming a top opening 16. As seen in FIG. 2, the top opening 16 is located above upper insulation retaining wall 17 of the range body and is defined by continuous extending depending flange 18 located therearound while the peripheral collar 14 merges with the rearwardly located control panel 19 having a plurality of control knobs 20 thereon for selectively energizing associated infrared radiant heating units. A pair of substantially rectangular cooking assemblies, indicated generally at 22 and 23, are especially adapted to be installed in the upper casing 12 of the range for location about the retaining wall 17.

The cooking assemblies 22, 23 are oriented in spaced side-by-side relationship below the opening 16 with their longitudinal axes oriented parallel to the sides of the range. As the cooking assemblies 22, 23 are identical in construction, like reference characters will be used to designate like or corresponding parts with the exception that for the left-hand assembly 23 the reference characters will be primed. Within the top opening 16 is an upper utensil supporting cover plate 24 that defines the complete surface and cooking area of the range 10. The cover plate 24 extends throughout the planar extent of the opening 16 and has continuous undersurface 25 that contacts underlying heating units forming part of the assemblies 22, 23 in a manner to be described.

It should be noted that while the instant invention will be described in conjunction with a free standing range depicted in FIG. 1, it is to be understood that the present invention is not intended to be so limited and that the control device could be used for example with a counter or drop-in type cooking arrangement without departing from the scope of the invention. Furthermore, the invention contemplates a single heating unit having a cover plate located heater in a range top or kitchen counter providing one or more heating areas.

The utensil supporting cover plate 24 is preferably formed of a high strength infrared transmissive material such as recrystallized glass-ceramic sold under the trade name Cervit by Owens-Illinois or Hercuvit by Pittsburgh Plate Glass Co. It will be appreciated however that other infrared transmissive material such as high silica glass for example could be used without departing from the scope of the invention. The cover plate 24 is shown in the preferred embodiment having a rectangular configuration with a length of approximately 25 inches and a width of approximately 20 inches and having a thickness of the order of one-fourth inch providing a smooth top cooking surface that will accommodate four radiant heating areas in a manner similar to a conventional electric range.

Turning now to FIGS. 2 through 4, the mounting arrangement for the glass-ceramic plate in conjunction with heating assemblies will now be described in sufficient detail as is relevant to the present invention. For more complete description of the radiant heating units reference should be had to the aforementioned U.S. Pat. application Ser. No. 48,390, filed June 22, 1970. FIG. 2 shows assemblies 22, 23 having a housing or pan member 26 comprising a bottom wall 27 provided with marginal sidewalls 28, 29 upstanding from the bottom wall 27 and a pair of marginal end walls 30, 31. The end walls are identical in cross section differing only in a lateral extent and as seen in FIG. 3 terminate in substantially horizontal end flange walls 32, 33 having downward directed lip portion represented at 34 in FIG. 3.

As indicated above the cover plate 24 together with the underlying cooking assemblies 22, 23 are mounted in the opening 16 substantially flush with the upper surface of collar 14 by continuous pressure-type securing means. As seen in FIG. 2 the securing means of the disclosed embodiment includes a substantially rectangular trim or sealing ring indicated at 40 together with a plurality of cooperating L-shaped clips 41 having individual pressure screws 42. As best seen in FIG. 3, the trim ring 40 is substantially T-shaped in cross section and includes a head 43 spanning gap 44 formed between the collar 14 and longitudinal and transverse edges of the cover plate 24, together with a depending stem 45 disposed in the gap. The stem 45 has formed along its lower end a hook portion 46 which provides shoulder means for interlocking engagement with cooperating hook portions 47 of the clip members 41.

The clips 41 are disposed at spaced intervals around the cover plate 24 to engage the underside of the range collar 14 by seating circular bead portion 48 of the clip members in the radiused area formed by the depending flange 18 of the opening 16, whereupon the clip pressure screws 42 are taken up to retain the cover plate and the cooking assemblies 22, 23 in the opening 16. Pressure screws 42 have rectangular plate members 49 located on the ends thereof for contact with the underside of the end flange walls 32, 33 when the screws 42 are tightened. As a result the cooking assembly housings 26 and 26' together with the cover plate 24 are anchored to the range collar 14 in a manner to hold heating units, to be described, in pressure contact of the undersurface of the cover plate 24.

Suitable cushioning means formed of refractory fibrous insulating material such as asbestos pads 50 are provided between the undersurface of the cover plate 24 and the upper surface of the end wall flanges 32, 33. Appropriate sealing material may be inserted between the inner and outer strips of the trim ring head 43 and the underlying peripheral borders of the cover plate 24 and collar 14 to provide a liquid-type seal therebetween. An example of such a sealing material is manufactured by Dow Corning under the trade name RTV Silicone.

It will be noted that the heating assemblies 22, 23 are secured to the range collar 14 and cover plate 24 by housing end flange walls 32, 33 along the longitudinal edges 51 of the cover plate 24. As seen in FIG. 2, the borders adjacent transverse edges 52 of the cover plate 24 are retained in the range collar by means of a trim ring 40 and clip 41 assembly described. Angular washer-type pressure members 54, used on the screws 42 along the transverse edges 52 of the cover plate, have resilient cushioning pads on their upper surfaces formed from a suitable refractory material such as asbestos.

In the illustrated form of the invention each housing 26 provides a boxlike receptacle defined by its side, end and bottom walls for receiving a resilient insulation mat 60 formed from a suitable organic fibrous insulation material such as rock wool, glass wool, asbestos fibers or the like. The mat 60 in the preferred form has a thickness of approximately 1 inch and a density of approximately 6 pounds per cubic foot. As indicated in the plan view of FIG. 4 the mat 60 extends throughout the bottom of the housing 26 conforming to the shape of the bottom wall 27. It will be seen that in the disclosed form the housing 26 has an oblique wall portion 56 forming part of the sidewall 28 to accommodate the smaller sized heating unit to be described.

As seen in FIG. 4 the insulation mat 60 has located thereon a pair of heating units indicated at 61, 62. Each of the units 61, 62 comprises a heater support block and a resistance element with the heating unit 61 having its heater block shown at 63 supporting a ribbon-shaped resistance element 64 while the heating unit 62 has a heater block 65 supporting a resistance element 66. In the form shown the continuous resistance element 64 is located within a convolute shaped groove 67 defining an annular heater area approximately 8 inches in diameter while the continuous resistance element 66 is located within a similar convolute groove 68 to define a heater area approximately 6 inches in diameter.

In the case of the right-hand cooking assembly 22, it is shown oriented with the larger heating unit 61 at the front of the range top while the left-hand assembly 23 has been reversed to locate the smaller 6-inch heating unit 62' at the front of the range. In this way the cooking assemblies 22, 23 are able to provide alternate small and large surface heating areas in both the front and rear of the cover plate 24 to assure maximum space for the cooking utensils. It will be observed that the larger heater block 63 has a generally octagon shape when viewed in plan in FIG. 4 locating three of its sides respectively adjacent to and substantially parallel with the end wall 30 and the sidewalls 28, 29 of the housing 26. The smaller heater block 65 has an irregular shape in plan to conform with the oblique wall portion 56 of the housing 26 along with the housing walls 29 and 31.

As seen in FIGS. 2 and 4 both the blocks 63 and 65 have an overall thickness which when combined with the thickness of the supporting mat 60 locates the upper peripheral faces 69, 70 respectively a defined distance above the housing end wall flanges 32, 33 such that the peripheral faces 69, 70 are brought into flush abutting contact with the undersurface 25 of the cover plate. The peripheral faces of the heater blocks 63, 65 are held in cushioned pressure abutment with the cover plate by means of the trim ring 40 and clip arrangement previously described. The heater blocks 63, 65 are retained in the housing 26 prior to final assembly in the range top by means of central holddown pins shown at 72 and 72' in FIG. 2 which extends through central bores in each of the heater blocks together with aligned bores in the underlying insulation mat 60 and housing bottom walls 27, 27' for reception on their free ends of suitable retaining members such as push nuts 73, 73' of known commercial type. A complete description of the heating unit mounting structure may be found in copending U.S. Pat. application Ser. No. 55,815, filed July 17, 1970, assigned to the same assignee as the instant application.

The heater blocks 63, 65 are cast or molded to provide disk shaped hollows defining recessed substantially circular areas 80, 81 in the block upper peripheral faces 69, 70 respectively. In the preferred form, the blocks 63, 65 have substantially identical thicknesses, within casting tolerances, of approximately 1.25 inches. For the purpose of this disclosure the heater blocks differ only in their outer configuration and the overall size of their recessed areas so as to provide different sized heating areas for the cover plate. Accordingly only the larger heating unit 61 will be discussed in detail with all the remarks being applicable to the smaller unit 63 with the single exception that the unit 63 has a lower wattage output.

It will be observed in FIG. 4 that the blocks 63, 64 are formed with opposed cavities indicated at 78, 79 respectively, to receive one end of a heat sensing device indicated generally at 82 forming part of a surface temperature indicating light circuit. For details of this indicator light portion of the ceramic top range reference should be had to copending U.S. Pat. application Ser. No. 55,816, filed July 17, 1970, assigned to the common assignee of this application.

In cooperative relation with each of the heating units 61, 62 there is provided a thermostatic device located on the exterior of the housing members 26 generally indicated at 83 and 84 respectively, which form the subject matter of the instant invention. The purpose of the thermostatic devices 83, 84 is to control the temperature of the cover plate 24 in response to the temperature of the infrared radiating heating elements 64, 66 located on the heater blocks to prevent over-temperature of the cover plate heating areas. Before discussing the thermostatic devices 83 and 84 however the description of the heating units will be completed so that the function of the devices will be more clearly understood.

Considering again the heating unit 61 of FIGS. 2 to 4 it will be seen that the convolute groove 67 is channel shaped in cross section and provides a path for locating the continuous resistance element ribbon 64 such that one end is positioned for electrical connection to inner terminal member 90 and its opposite end in connection to an outer terminal member 91.

The terminal members 90, 91 are identical so as to be interchangeable with either heating unit and comprise an insulating column 92 formed of electrical porcelain or the like provided with an axial chamber receiving a vertical terminal blade 93 therein as shown in FIG. 2. The details of the terminal connectors form no part of the instant invention and are described and claimed in the copending U.S. Pat. application Ser. No. 55,815.

By virtue of the foregoing arrangement it will be noted that the resistance element 64 has a deeply undulating or sinelike pattern and is supported in the spiral groove 67 to establish a defined vertical air gap indicated at G in FIG. 2 between the cover plate under surface 25 and the element which in the form shown provides a minimum spacing therebetween of one-fourth inch which is the minimum distance permitted by Underwriters Laboratory between an uninsulated conducting member and an adjacent conductor.

To produce the required wattage output for the heating units of the preferred form it was determined that an element to be used which can be self heated in the range of 1,500° to 2,000° F. and constructed of a high temperature resistive material selected from the iron-chromium aluminum family of electrical resistance material. An iron-chromium-aluminum ferrite alloy is preferred because it has a higher melting point and a higher electrical resistivity allowing it to be operated at higher temperatures within the above-mentioned range. For further details of the resistance element structure together with the arrangement for supporting it on the heater blocks reference should be had to the copending application Ser. No. 48,390 referred to above. It should be mentioned however that in this preferred form the ribbon element 64 is formed having a thickness of the order of 9 mils and a height of approximately 125 mils capable of developing a wattage output of approximately 2,000 watts at 236° volts AC. In the case of the resistance elements 66 for the smaller heating unit 62 a continuous ribbon member of the same height but having a somewhat reduced thickness of the order of 7 mils is used to provide a wattage output of approximately 1,200 watts at 118 volts AC.

Considering now the instant temperature limiting thermostatic device 83 for heating unit 61 it will be seen from the cross-sectional view of FIG. 6, that a U-shaped bracket 150 is provided having substantially parallel lower and upper arms 152 and 154. The bracket 150 is secured on the exterior of the housing sidewall 29 by means of downwardly extending flange 156 of the lower arm 152 having opening 158 thereon for reception of a suitable threaded fastener 160. Notice that the elongated opening 158 is formed in the flange 156 so as to provide a wide vertical adjustment of the bracket.

The base wall 161 of the bracket 150 has an integrally formed conduit or tube 162 with outer hemispheric portions notched or removed at each end 163, 164 (FIG. 7) for reception of a thermostatic member indicated at 165 to be described. The upper arm 154 of the bracket has a parallel offset heat sensing flange 166 positioned such that its bottom surface engages the upper peripheral face 69 of the heater block 63. By this arrangement the heat sensing flange 166 is sandwiched between the heater block peripheral faces 69, 70 and the cover plate undersurface 25 so as to be pressure biased in conductive heat transfer relation with the cover plate while locating the flange 166 outside the confines of the heating areas A and B so as to be shielded from radiant heat from the resistance elements 64 and 66 by the heater blocks 63 and 65, respectively. This arrangement prevents interference with the transmission of infrared rays from the resistance elements to utensils on the cover plate heating areas. Because of the low compressive strength of the fibrous-ceramic blocks the heat sensing flange 166 is embedded into the peripheral face 69 of the heater block by pressure of the cover plate 24 upon tightening of the trim ring assembly 40 as seen in FIG. 7 such that the flange 166 is substantially flush or in planar relation with the remainder of the peripheral face 69 of the heater block. Thus, the upper face of the heat sensing flange is in pressure heat or thermal conducting relation with the cover plate 24 whereby the flange 166 will heat and cool proportionally to the heating and cooling of the temperature of the cover plate. Also, the fact that the heat sensing flange 166 is embedded within the upper peripheral face 69 of the block 63 assures a good air seal between the heater block 63 and cover plate 24 to minimize the outward passage of convective heat from the resistance element recessed area 80 preventing the overheating of adjacent areas of the range top or other range components.

It will be noted that by virtue of applicant's arrangement the thermostatic devices 83, 84 are identical in construction and are located on the sidewall 29 of the housing members 26 which are substantially parallel to and coextensive with the transverse edges 53 of the cover plate. As the disk-shaped recessed areas 80 and 81 are positioned with their outer edges substantially tangent to a construction line parallel with sidewalls 29 the cooking assemblies 22, 23 are able to locate the heat sensing flanges 166 of each bracket 150 in substantially similar positions with the heating units 61, 62 between the cover plate outer transverse edge 52 and its associated heater block recessed area 80, 81. In this manner the marginal portions of the cover plate 24, indicated by dimensions M and M' in FIG. 2, are substantially equal to provide uniform heat sensing areas for contact by the heat sensing flanges 166 having substantially the same heat dissipating characteristics.

The flange and arm portions of the bracket have a thickness of approximately 0.060 inches and are composed of 1076-P type aluminum in the preferred form, having good thermal conductivity to constitute a thermal link or heat conduction path to the integrally formed tube 162 in the base 161 of the bracket 150. The tube 162 defines a channel 167 of generally cylindrical configuration that extends transversely across the wall base 161. The thermostat 165 is of the differential-expansion type having an outer heat-sensing shell or sleeve 170 formed of high expansion material such as stainless steel mechanically connected to a low-expansion rod 172 made of a material of low thermal expansion. The rod 172 in turn actuates the contacts 174, 175 of a single throw switch 176. The thermostat 165 has a control knob 178 mounted on a threaded shaft 180 through a bushing 182. A pin 184 of dielectric material projects from the free end of shaft 180 through an aperture in the contact spring 186 into engageable relation with the leaf spring 188 whose contact 175 is mated with that of the contact 174 of leaf spring 186 and positioned in accordance with the setting of the knob. The positioning of spring 186 with respect to spring 188 for any setting of knob 178 is under the control of dielectric stop member 190 located on an arm 191 which is in thermal contact with the internal fixed rod 172 of the thermostat.

The thermostat 165 is a common inexpensive differential expansion rod-and-tube type arranged to open on temperature rise manufactured, for example, under the trademark "Klixon" by Texas Instruments, Inc. and in the instant embodiment is fixedly calibrated to break open when it reaches a predetermined temperature. As seen in FIG. 7 the thermostat 165 has mounting flanges 192 for reception in notch 163 and is secured to the bracket by suitable means such as screw fasteners 193.

As stated above, the differential expansion thermostat 165 is calibrated to break open the electrical contacts 174, 175 when it senses a desired predetermined temperature which in the instant form is 430° F. ± 10° F. As seen in the schematic of FIG. 8 the thermostat contact 174 is connected in series with its associated electrical resistance element, which for the heating unit 61 is element 64, by means of the lug 194 and terminal 195 attached to the end of the thermostat base member 196. FIG. 8 shows a portion of the range circuit for the heating unit 61 wherein power is supplied to the range top from the usual single phase, 236 volt, alternating current, three wire Edison service entrance found in an adequately wired residence. The three wires are identified as line wires $L_1$ and $L_2$ shown and a neutral wire (not shown). Leads 197 and 198 are connected to the remaining heating unit circuits and a description of the complete wiring diagram may be had in the aforementioned U.S. Pat. application No. 55,816.

The line $L_1$ is shown connected to an energy varying or infinite heat switch assembly on controller 200, shown boxed in by dashed lines. The switch 200 is of a conventional type more particularly set forth, for example, in U.S. Pat. No. 2,623,137, having a first single-pole and single-throw (SPST) line switch for the heating unit 61 providing a pair of contacts indicated at 201, 202. A second SPST switch for a signal lamp circuit has a pair of contacts 203, 204 so that as its associated control knob 20 is rotated from its off position both the first and second SPST switches close by a conventional cam arrangement to route power to the unit 61 and its signal lamp (not shown). The conductor 206 from $L_1$ is connected to contact carrying arm 207 of the switch assembly 200. The arm 207 has contact 208 for pulsing contact with contact 209 on the electrically conductive bimetallic arm 210 of the switch, and further includes a heater 211 electrically connected to arm 210 and by a conductor 212 to one end of the resistance element 64 of the right-hand 8-inch heating unit.

It is necessary for the thermostat 165 to have a temperature sensor that is in heat transfer relation with the cover plate contiguous with its associated utensil heating area, defined by and coextensive with resistance element recessed areas 80, 81, (indicated by dimensions "A" and "B" respectively in FIG. 2), which in turn receives and then acts upon this temperature information and maintains the temperature of the cover plate heating area below a predetermined amount which in the case of the disclosed recrystallized glass-ceramic material is of the order of 1,300° F. It is important that recrystallized glass-ceramic materials of the type mentioned above, namely Cervit and Hercuvit, should not be continuously exposed to temperatures exceeding 1,300° F. because the manufacturer has stated that temperature exposure above this limit will result in permanent change in physical properties of the material. A relatively inexpensive differential-expansion thermostat of the type used in the disclosed device cannot be relied upon at service temperatures much above 800° F. By means of the analog bracket arrangement 150, however, which isolates the thermostat outside the confines of the cooking assembly 22 and in spaced relation below the cover plate 24 the result is that rather than detecting the cover plate heating area temperature directly the device conductively senses an extensive portion of the glass-ceramic cover plate contiguous with the heating area. It should be noted that in the preferred form the glass-ceramic cover plate 24 is optically translucent having a milky-appearing color in its unheated state while in its heated condition it attains an "orange glow" defined by the annular areas A and B in FIG. 2.

In order for the bracket 150 to obtain good thermal conducting action, the aluminum heat sensing flange 166 is formed integral with the tube 162 for the greater portion of the length of the thermostatic sleeve 170. The heat sensing flange 166 is sandwiched between the cover plate undersurface 25 and the peripheral face 69 of the heater block to be in full pressure contact with the cover plate so as to obtain generally uniform heat distribution along the flange 166 compensating for the fact that the highest temperature point of the heating area tends to move or "float" and cannot be determined with any degree of certainty. This "floating" is caused in part by the variance in cooking vessels which could be used with the ceramic top range. The flange 166 stops short of recessed area 80 defining the cover plate utensil heating area which allows the heater block 63 to shield the bracket flange 166 from radiant heat rays from the heating element 64 and eliminates any unwanted dark shadows or "spots" becoming visible during energization of the heating units.

When the surface heating unit 61 is energized to initiate a cooking operation, the major portion of the heat from the resistance element 64 will be transferred upwardly into the vessel, chiefly by radiation through the cover plate and to a lesser extent by conduction, after the cover plate temperature is elevated by a portion of the radiant heat waves impinging on the cover plate. As the heat sensing flange 166 is vertically located adjacent the cover plate heating area and is oriented in such a manner that it is never subjected to stray radiant heat from the heating element 64 but only to conductive heat from the contiguous heating area "A" the flange 166 will closely follow or track the temperature of the energized heating area. Thus, bracket 150 constitutes a thermal link or path providing good heat conduction, in either direction, between the thermostatic sleeve 170 and the cover plate heating area and thereby aids in maintaining the temperature of the sleeve 170 very close to the temperature of the flange 166. It will be appreciated that any residual or stray heat reaching the bracket 150 is readily conducted downwardly through flange 156 to the support housing 26 so that the effect thereof on the thermostat sleeve 170 is minimized.

While the embodiment of the present invention as herein disclosed constitutes a preferred form, it is to be understood that other forms might be adopted.

I claim:

1. A radiant cooking assembly comprising an upper utensil supporting cover plate of infrared transmissive glass-ceramic material, a refractory heater block disposed below said cover plate by support housing means, said heater block having a raised peripheral face defining a central recessed area in spaced relation with the undersurface of said cover plate, means for biasing said heater block peripheral face into pressure contact with said cover plate undersurface, an infrared radiating resistance element located on said central recessed area in spaced relation below said cover plate defining a cover plate utensil heating area coextensive with said recessed area, a control circuit for energizing said resistance element, a temperature limiting device for maintaining the temperature of said cover plate below a preselected maximum temperature, said temperature limiting device comprising temperature sensitive bracket means for supporting a differential-expansion type thermostat in heat transfer relation therewith exterior of said support housing means and spaced below said cover plate, said bracket means having a heat sensing flange sandwiched between said heater block peripheral face and said cover plate undersurface so as to be pressure biased in conductive heat transfer with said cover plate, said heat sensing flange located outside the confines of said heating area so as to be shielded from radiant heat from said resistance element by said heater block to thereby conductively sense the temperature of said cover plate contiguous with said heating area, said thermostat having switch means in said control circuit whereby said thermostat under the influence of said bracket means temperature functions to heat and cool proportionally to the heating and cooling of said heating area such that said resistance element is open circuited by said switch means whenever the temperature of said heating area exceeds said preselected maximum temperature.

2. A temperature limiting device in combination with a radiant heating unit, said combination comprising, an upper utensil supporting cover plate of infrared transmissive glass-ceramic material, a heater block composed of low density fibrous refractory material disposed below said plate by a metallic support housing, said heater block having a raised peripheral face defining a central recessed area in spaced relation with the undersurface of said cover plate, means for biasing the peripheral face of said heater block into pressure engagement with said cover plate undersurface, a convolute shaped infrared radiating resistance element located on said central recessed area defining a cover plate utensil heating area coextensive with said recessed area, a control circuit for energizing said resistance element, an energy varying switch in said control circuit pulsatingly varying the power input to said resistance element, a temperature sensitive U-shaped bracket for supporting a differential-expansion type thermostat exterior of said support housing and spaced below said cover plate, said U-shaped bracket having upper and lower flanges integral therewith, said upper heat flange sandwiched between said heater block peripheral face of said cover plate undersurface so as to be pressure biased in conductive heat transfer with said cover plate, said heat sensing flange located outside the confines of said heating area so as to be shielded from radiant heat from said resistance element by said heater block to thereby conductively sense the temperature of said cover plate contiguous with said heating area, said lower flange being adjustably secured to said support housing whereby said biasing means being operative to embed said temperature sensitive upper flange in said heater block peripheral face such that the upper surface of said flange is substantially planar with said heater block peripheral face, said U-shaped bracket having a tubular channel integrally formed in the base portion of said U-shaped bracket, said thermostat having switch means in said control circuit and an elongated heat-sensitive sleeve telescopically received in and surrounded by said tubular channel, said sleeve and said tubular channel being positioned in intimate heat transfer relationship throughout substantially their entire peripheral surfaces, said U-shaped bracket operative to heat and cool said thermostatic sleeve proportionally to the heating and cooling of said cover plate heating area such that said resistance element is open circuited by said switch means whenever the temperature of said heating area exceeds said preselected maximum temperature.

3. A temperature limiting device in combination with an infrared radiant cooking assembly for mounting in a range top or the like having an opening therein, said assembly comprising a frangible cover plate of infrared transmissive recrystallized glass-ceramic material including an upper utensil supporting surface, said cover plate positioned in said opening whereby a continuous gap is defined between the edges of said cover plate and said opening, a lower support housing positioned below said cover plate having a bottom wall, end walls, and sidewalls defining a boxlike receptacle, at least one radiant heating unit supported in said housing, said heating unit including a fibrous-ceramic heater support block having a substantially planar raised peripheral face defining a central recessed area, said recessed area supporting an infrared emissive uninsulated electrical resistance element thereon in spaced relation below the cover plate heating area defined by said recessed area, continuous pressure clamping means positioned in said gap for retaining said cover plate and said housing in said range opening, a control circuit for energizing said resistance element across first and second power lines, a variable energy output switch in said control circuit pulsatingly varying the power input to said resistance element, a thermostatic control device including a switch in said circuit arranged to limit the temperature of said cover plate to a maximum temperature of the order of 1,300° F., said control device including a temperature responsive U-shaped support bracket fixed on the exterior of said housing having an upper cover plate temperature sensing flange integral therewith, said temperature sensitive flange located on the peripheral face of said heater block whereby said flange is held in compressed thermal conductive contact with the undersurface of said cover plate by said continuous pressure clamping means, said heat sensing flange located outside the confines of said heating area so as to be shielded from radiant heat from said resistance element by said heater block, said U-shaped bracket having a tubular channel integrally formed in the base portion thereof, said thermostatic control device having an elongated thermostatic sleeve telescopically received in and surrounded by said tubular channel, said sleeve and said tubular channel being positioned in intimate heat transfer relationship throughout substantially their entire peripheral surfaces, said support bracket being composed of metal having good heat conducting properties and serving to thermally isolate said thermostatic sleeve from direct radiation from said resistance element, said thermostatic control device calibrated to open its line circuit switch at a cover plate temperature contiguous with said heating area of the order of 430° F. whereby said sleeve functions to heat and cool proportionally to the heating and cooling of said cover plate such that upon said cover plate heating area attaining temperature exceeding approximately 1,300° F. said thermostatic switch will open to remove said heating element from said power source.

4. A temperature limiting device in combination with each heating unit of an infrared radiant cooking assembly for mounting in a range top or the like having an opening therein, said assembly comprising a translucent cover plate of infrared transmissive glass-ceramic material including an upper utensil supporting surface, said cover plate positioned in said opening whereby a continuous gap is defined between the longitudinal and transverse edges of said cover plate and said opening, a lower housing positioned below said cover plate having a bottom wall, end walls and sidewalls defining a boxlike receptacle, said housing having one sidewall parallel with and adjacent to a transverse edge of said cover plate, a pair of radiant heating units having dissimilar wattage outputs supported in said housing, each said heating unit including a fibrous-ceramic heater block having a substantially planar raised peripheral face positioned above the side and end walls of said housing defining a central substantially disk-shaped recessed area, said heating unit recessed areas being of dissimilar size whereby their outer edges are aligned on a tangent substantially parallel to said one housing sidewall, said recessed areas each supporting an infrared emissive uninsulated electrical resistance element thereon in spaced relation below the undersurface of said cover plate, continuous pressure clamping means positioned in said gap for retaining said cover plate and said housing in said range opening, a control circuit for energizing said resistance element across first and second power lines, an infinite heat type switch in said control circuit associated with each said heating unit pulsatingly varying the power input to their respective resistance elements, a pair of identical thermostatic control devices each including a switch in said circuit associated with each of said heating units respectively to limit the temperature of said cover plate heating areas to a maximum temperature of the order of 1,300° F., each said control device including a temperature responsive U-shaped support bracket having an upper heat sensing flange and a lower securing flange integral therewith, each of said upper heat sensing flanges located on the upper peripheral face of each said heater block whereby said heat sensing flange is embedded in the peripheral face thereof such that its upwardly facing surface is maintained in pressure thermal conductive contact with the marginal undersurface portions of said cover plate by said continuous pressure clamping means, said upper flange being substantially similarly positioned between said cover plate outer transverse edge and its associated heater block recessed area, each said bracket lower flange being fixed to said one housing sidewall, each said U-shaped bracket having a tubular channel integrally formed in the base portion thereof, said thermostatic control device having an elongated thermostatic sleeve telescopically received in and surrounded by said tubular channel, said sleeve and said tubular channel being positioned in intimate heat transfer relationship throughout substantially their entire peripheral surfaces, said support bracket being composed of metal having good heat conducting properties and serving to thermally isolate said sleeve from direct exposure to temperatures within said heater block recessed areas, each said thermostatic control device calibrated to open its line circuit switch at a cover plate temperature intermediate its associated recessed area and the adjacent edge of said cover plate of the order of 430° F. whereby said sleeve functions to heat and cool proportionately to the heating and cooling of said marginal undersurface area of said cover plate heating area such that upon said cover plate heating area attaining a temperature in excess of the order of 1,300° F. said thermostatic switch will open to remove its associated heating unit from said power lines.

* * * * *